United States Patent [19]

Covington, Jr. et al.

[11] 4,228,005
[45] Oct. 14, 1980

[54] MECHANICAL DEWATERING APPARATUS FOR ELASTOMER SLURRIES

[75] Inventors: Robert A. Covington, Jr.; Okan M. Ekiner, both of Wilmington, Del.

[73] Assignee: E. I. Du Pont de Nemours and Company, Wilmington, Del.

[21] Appl. No.: 916,913

[22] Filed: Jun. 19, 1978

Related U.S. Application Data

[62] Division of Ser. No. 801,370, May 27, 1977, Pat. No. 4,132,845.

[51] Int. Cl.² .................... B01D 21/14; C08F 6/22
[52] U.S. Cl. .................... 210/207; 210/220; 210/251; 210/523; 425/208
[58] Field of Search ........... 210/523, 152, 512 R, 210/207, 220, 251; 425/205, 208; 528/499; 264/329

[56] References Cited

U.S. PATENT DOCUMENTS

| | | | |
|---|---|---|---|
| 2,931,508 | 4/1960 | Morris et al. | 210/512 R |
| 3,439,810 | 4/1969 | Newman et al. | 210/512 R |
| 3,457,880 | 7/1969 | Eppenberger | 425/205 X |
| 3,859,217 | 1/1975 | Holstead et al. | 210/523 |
| 3,920,229 | 11/1975 | Piggott | 425/205 X |

*Primary Examiner*—Frank A. Spear, Jr.

[57] ABSTRACT

A method is provided for isolating an elastomer from a mixture of the elastomer and water containing up to about 90% by weight water by feeding the mixture into a thermally controlled, vertical separator containing a rotating screw, simultaneously feeding excess water under pressure into the separator, withdrawing concentrated elastomer containing less than about 10% by weight total volatiles (including water) from the metering section of the separator and withdrawing feed water and excess water from a water discharge port located near the upper end of the separator.

In addition, apparatus for isolating elastomers from mixtures of elastomers and water is provided.

6 Claims, 7 Drawing Figures

MECHANICAL DEWATERING APPARATUS FOR ELASTOMER SLURRIES

This is a division of application Ser. No. 801,370, filed May 27, 1977, now U.S. Pat. No. 4,132,845.

BACKGROUND OF THE INVENTION

This invention relates to methods and apparatus for isolating polymers for further processing from mixtures of polymers and water. As obtained from the polymerization vessel, polymerized compositions may contain up to about 90% by weight water, and it is often desirable to isolate the polymer from the water to produce a product containing less than about 5% by weight residual moisture.

Further, this invention relates to methods of isolation of a polymer from mixtures of the polymer and water wherein the specific gravity of the polymer is greater than that of water.

This invention is especially useful in the separation of fluoroelastomers from mixtures thereof in water.

Screw extrusion of materials such as elastomeric polymers is well known. During the extrusion process, minor amounts of residual moisture in the polymer may be removed through heating and working of the screw upon the polymeric material, by atmospheric or vacuum venting.

When the water content of such an elastomeric polymer is substantial, conventional screw extrusion is inadequate to effect water removal without serious impairment of process efficiency and/or product properties. Thus, when the water content is high, special methods must be employed to remove excessive amounts of water.

A method and apparatus for water removal from mixtures of plastic materials and water is disclosed in U.S. Pat. No. 3,035,306. That reference discloses a method and apparatus for removing water from plastic materials which are lighter than water to a degree of less than about 1% by weight residual moisture. The dewatering is accomplished by feeding a stream of synthetic rubber and water to a screw extrusion device such that the longitudinal axis of the screw is inclined upwards from the horizontal. Feeding of the synthetic/water mixture is through a feed port located at a vertical level below that of the extruder discharge port, and a drain opening for discharging water is provided, located below the feed port.

The separator described in U.S. Pat. No. 3,035,306 is also said to be useful for plastics which are heavier than water if the extruder separator is oriented such that its axis is directed downwardly with the feed end located vertically higher than the polymer discharge end. In practice, however, attempts to dewater fluoroelastomers by this process and using apparatus as described in the cited reference have proven unsatisfactory, since by this method excessive amounts of polymer were carried away by the discharging water.

SUMMARY OF THE INVENTION

This invention comprises a method and apparatus for separating a polymeric material from a mixture of the polymeric material in water. In accomplishing this separation, it has been discovered that efficient and continuous separation may be achieved by adding excess water under pressure to the polymer/water mixture in a separator. Accomplishing efficient and improved separation of water from a mixture of polymer and water by the addition of more water is indeed a surprising and unexpected result.

A further unexpected result of this invention is that subsequent washing of the dewatered product to remove soluble salts is not necessary as it often is in conventional processes. By the process of this invention, the soluble salts are removed during the dewatering process and are carried away in the excess water discharging from the separator.

The method of this invention of isolation of a polymeric material from a mixture of this material in water comprises the steps of:

(1) feeding the polymer/water slurry, which may contain up to about 90% by weight water, through a feed port into a vertically disposed separator containing a rotating screw which forces the polymer toward the bottom discharge port of the separator; and (2) introducing excess water under pressure into the upper end of the separator which also has a valved discharge port located near its upper end through which feed water, excess water and soluble salts discharge while dewatered polymer exits simultaneously from the bottom discharge port of the separator.

As previously stated, the method of this invention is useful for separation of polymers from polymer/water slurries in which the density of the polymer is greater than that of water. Since the polymer is heavier than water, upon feeding the slurry to the separator the polymer settles to the lower end of the settling section of the separator, and a well-defined line of separation of the polymer-rich phase from the water above the polymer-rich phase develops and can be monitored, e.g., by sight glass.

The vertically disposed separator of this invention comprises four sections. The top section is the settling reservoir, referred to hereinabove. Immediately below the settling reservoir is the cylindrical feed section, into which the slurry is fed through an inlet port. Below the feed section is a conical compression section tapering from the larger diameter of the settling and feed sections into the smaller diameter of the bottom cylindrical metering section located below the compression section.

Means for controlling the temperature of the feed, compression and metering section are provided if necessary for the particular separation being performed.

Within the separator and extending through feed, compression and metering sections is a rotating screw having suitable drive means for controlling speed of rotation. The screw comprises a stem and helical flights whose outer diameters correspond to the diameters of the feed, tapered compression, and metering sections, allowing for sufficient clearance between outside edge of the flights and the inside wall of the separator to provide both metering of polymer and necessary water back flow. Design of such screws is known to those skilled in the extrusion art. With the exception that the uppermost flight is preferably of a special design as discussed hereinbelow, the design of the screw useful in this invention is conventional.

An inlet port and a valved discharge port are located in the upper feed section of the separator for the purpose of feeding excess water under pressure into the separator and for discharging excess water, feed water and soluble salts. For purposes of this disclosure, the term "excess water" means the additional water fed into the system through the aforementioned water inlet over and above the feed water which enters the separator in the polymer/water slurry.

As an alternative to feeding a slurry to the separator, the polymer/water mixture may be fed as wet crumb, by means of a stuffer screw and hopper, for dewatering.

The separator of this invention is useful for isolating elastomeric polymers from water slurries to a level of residual water of about 2% by weight. The polymer discharge stream from the separator may be fed to a conventional twin screw extractor-extruder for vacuum drying and dispersion of curing and stabilizing materials if desired.

REFERENCE TO THE DRAWINGS

Figure 5:
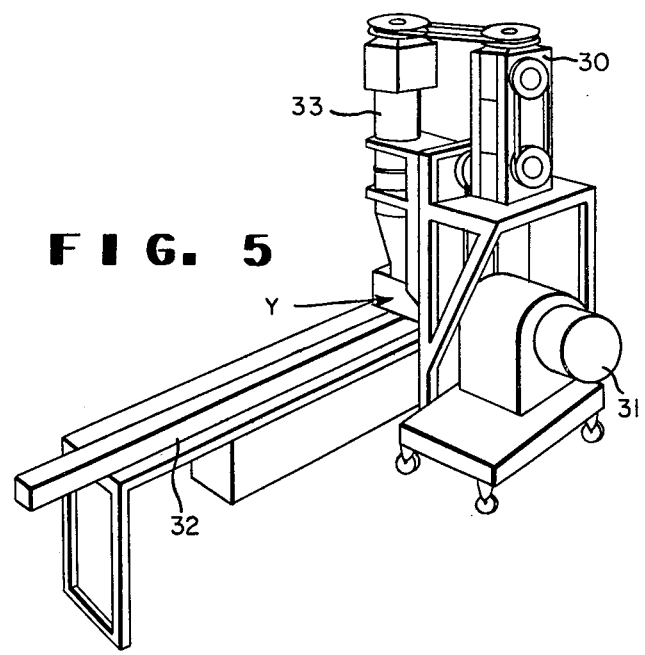

FIG. 5 schematically indicates the coupling of the separator of this invention with a conventional twin-screw extractor-extruder.

Figure 6:
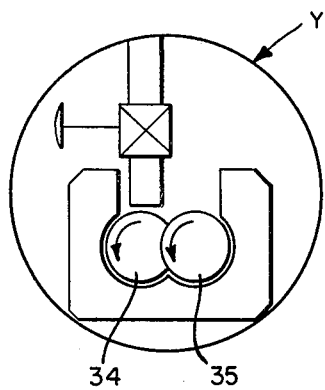

FIG. 6 indicates in detail the discharge port of the separator entering the feed port of the extractor-extruder as shown in FIG. 5.

Figure 7:
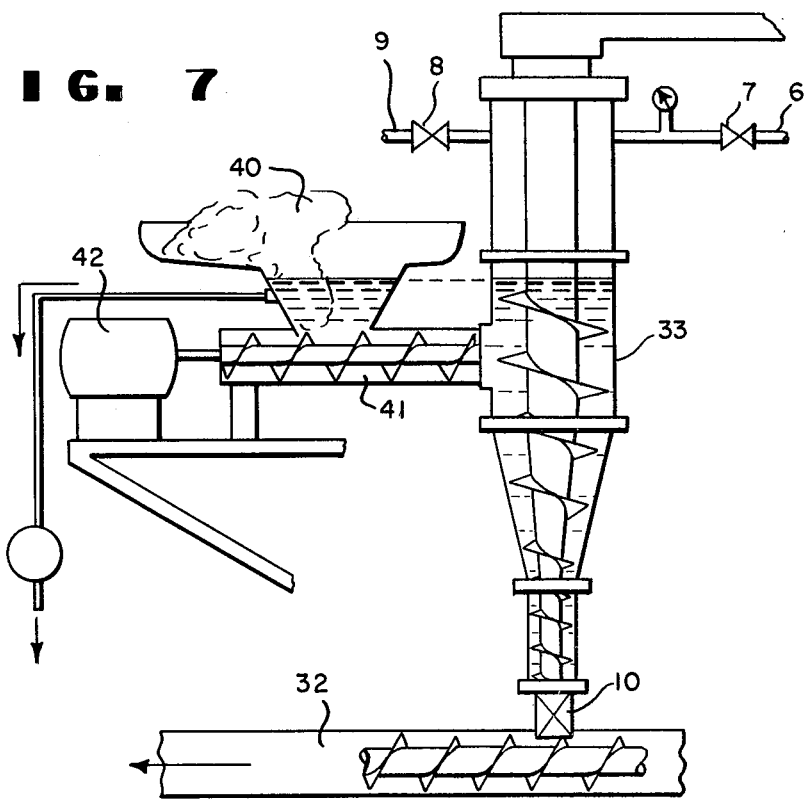

FIG. 7 shows polymer being fed to the separator of this invention in the form of wet crumb containing up to about 50 weight percent water.

Figure 1:
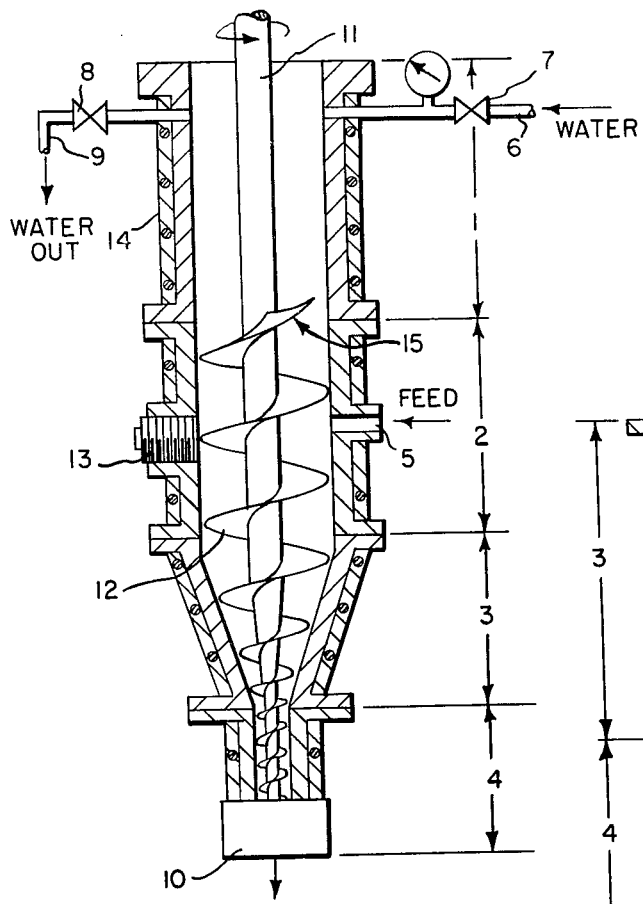
FIG. 1 is a schematic drawing of the apparatus used to carry out the process of this invention.

In FIG. 1, there is shown upper settling section 1, feed section 2, tapered compression section 3, and polymer metering section 4.

In the process of this invention, a polymer/water slurry is fed through feed port 5 into the feed section 2 while water is simultaneously fed under pressure through inlet 6 containing valve 7. Inside the separator is a rotating screw having stem 11 and helically disposed flights 12. The uppermost flight 15 is preferably of a design discussed further hereinbelow.

Dewatered polymer exits metering section 4 through die/valve 10 and excess water and feed water exit through outlet pipe 9 having valve 8 for regulating back pressure in the separator.

Also in FIG. 1, feed port 13 which is used when feeding wet polymer in crumb form, is shown plugged.

Temperature control is achieved by means 14, shown schematically.

Figure 2:
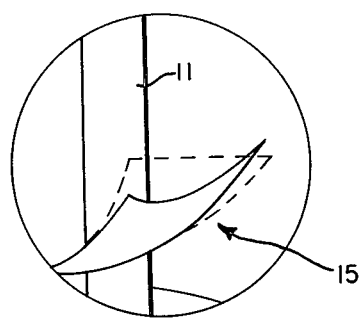
FIG. 2 shows in detail the uppermost flight of the helical screw shown in FIG. 1.

FIG. 2 indicates in detail the preferred shape of uppermost flight 15 of the rotating screw. The dashed lines of FIG. 2 show the conventional screw flight, which has been modified by cutting and bending into the shape shown by the solid line. This configuration minimizes dense-phase polymer bridging and enhances polymer feed rate.

Figure 3:
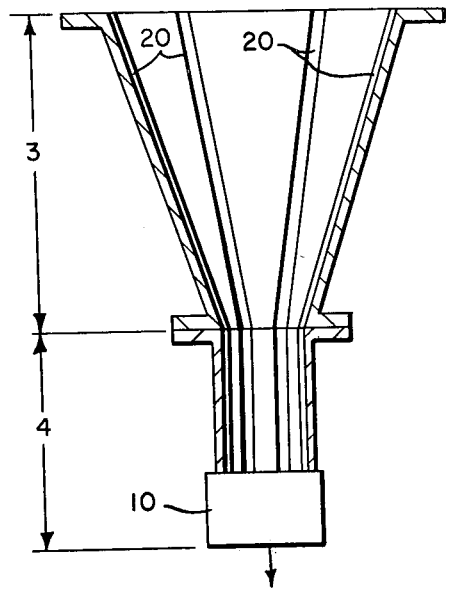
FIG. 3 shows in detail the axial fluting of the walls of the compression and metering sections of the separator of this invention.

FIG. 3 is a sectional view of the separator showing the inside wall to be fluted in the metering section 4 and compression section 3. All other nonessential detail is omitted from FIG. 3 for convenience. This fluting 20 is further illustrated in top view in FIG. 4.

FIG. 5 shows the separator of this invention 33 coupled with a conventional extractor-extruder 32. Drive mechanisms 30 and 31 for driving the separator and extruder, respectively, are shown schematically, again omitting nonessential detail for convenience.

In FIG. 6, polymer discharging from valve 10 is shown being fed to extruder 32 having twin screws 34 and 35.

FIG. 7 shows the apparatus of this invention used to dewater polymer in the form of wet crumb. In FIG. 7, wet crumb 40 is fed to separator 33 by means of screw 41 driven by drive mechanism 42, while water is simultaneously fed into the separator through inlet port 6. Dewatered polymer discharges through valve 10 into extruder 32 and feed water and excess water discharges through outlet pipe 9 having valve means 8 for regulating back pressure. Some excess water is also discharged from the crumb feed hopper through line 43 as shown.

DETAILED DESCRIPTION OF THE INVENTION AND PREFERRED EMBODIMENTS

By the process of and using the apparatus of this invention, improved, continuous and efficient removal of water from slurries of polymer in water is accomplished by adding excess water under pressure to the mixture. In the isolation of a polymer which is heavier than water, e.g., a fluoroelastomer which may be a copolymer of vinylidene fluoride and hexafluoropropylene optionally containing polymerized tetrafluoroethylene and/or brominated monomer, the following process may be utilized.

A slurry containing up to about 90% water is fed to the apparatus as shown in FIG. 1. Simultaneously, excess water is fed under pressure into the upper settling section 1 of the vertically disposed separator. Because it is heavier than water, the polymer settles in the feed section and the conical compression section 3. The degree of separation into a two-phase system is influenced by the pressure of the water in the upper settling reservoir, and when this pressure is sufficiently high, a distinct two-phase system results, which may be monitored by means of a sight glass, i.e., the separation line between the water phase in the settling reservoir and the settled water/polymer phase in the feed section is distinctly observable, and its movement may be used as a process control variable to regulate the slurry feed rate. The amount of excess water should be sufficient to maintain the pressure in the settling reservoir at a level high enough to effect this two-phase separation.

By means of the rotating screw shown in FIG. 1, the polymer/water mixture is forced toward the metering section 4, and water is squeezed out of the slurry in the compression section and flows upward into the feed and settling sections, while dewatered polymer exits through valve 10. The uppermost flight 15 of the rotating screw in the separator preferably does not extend significantly into the settling section and the point of this flight shown in FIG. 2 preferably passes below the interface between the polymer-rich phase and the water.

The length of the upper settling reservoir is not critical. This reservoir must have sufficient volume to permit gravitational separation of the water and water/slurry mixture, and otherwise may be of convenient length to permit the necessary water piping, sight glasses and the like.

Figure 4:
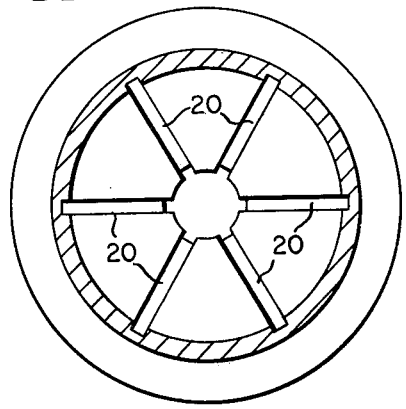
FIG. 4 is a top view showing the fluting of the walls of the separator.

The conical compression and metering sections are preferably fluted as shown in FIGS. 3 and 4, containing axial protrusions or indentations. These can also be in the form of spiral flutes having a pitch opposite to the pitch of the screw flights. The purpose of having such a fluted, rifled or otherwise interrupted surface is to promote polymer drag and prevent polymer slippage.

The rotating screw is composed of stem 11 having helically disposed flights 12. These flights are of constant diameter in the feed section and of tapering diameter in the conical compression section and, finally, constant diameter in the metering section.

The four sections of the separator have independent temperature control means for regulating the temperature of different polymers being dewatered.

The slurry to be dewatered may be pumped into the feed section as shown in FIG. 1 or into the lower part of the settling reservoir. The pressure in the settling reservoir is regulated by means of a back-pressure regulator located in the discharge water outlet line. This pressure is usually controlled between 20-100 psi.

By operation of the process of this invention, using the apparatus described, dewatering of polymer/water slurries may be accomplished to residual water levels of at least about 10% by weight and dewatering to about 2% by weight has been achieved as shown in the examples which follow.

EXAMPLE I

The following example was performed using the apparatus shown in FIGS. 1 through 6.

Three different fluoroelastomer emulsions were supplied from a jacketed tank, metered by means of a Moyno® pump, to a heated, stirred coagulation vessel. In each case, an aqueous coagulant solution of one gram of aluminum potassium sulfate per 100 grams of polymer was supplied from a heated tank by a metering pump which adjusted the coagulant flow rates for proper coagulation. A two-phase slurry was obtained in the stirred coagulation vessel and pumped under pressure into the feed port of the dewatering separator.

In the separator, a constant water back-pressure was maintained in the settling reservoir to aid dense phase settling of the polymer and to minimize polymer particle carry-over into the combined excess water and squeezed water discharge stream. The slurry and excess water separated rapidly into a polymer-rich phase and a clear water phase above.

The polymer-rich phase settled in the feed section and advanced downwardly by the action of the rotating screw into the compression section and thence into the metering section, during which process water was squeezed from the polymer slurry and flowed upwards to the settling section and out the water discharge port.

In order to provide a complete integrated process for the isolation of fluoroelastomer emulsions to final product, the vertical dewatering separator of this invention was coupled with a conventional twin-screw extractor-extruder for final vacuum drying and dispersion of curing and stabilizing chemicals. The extruder employed for these examples was a Werner and Pfleiderer Model ZSK (53 mm.) extractor-extruder. Other commercially available extractor-extruders were evaluated for this purpose, and the W&P Model ZSK was found to be the most efficient. This assembly is illustrated in FIGS. 5 and 6. This seven-section twin-screw extruder was sufficient for final drying and compounding of the mechanically dewatered feed emulsions.

The final moisture was extracted through a vacuum port located at the Section #4 position. The vacuum port was equipped with a vent port stuffer to prevent plugging.

A melted mixture of the chemicals to be incorporated into the polymer (benzyltriphenylphosphonium chloride and Bisphenol AF) was metered by means of a gear pump into Section #5. The chemicals were dispersed in the polymers in the last three sections of the W & P extruder. The chemical injection rate was controlled as a function of the extruder throughput. In other experiments, other additives in powdered form have also been incorporated into the polymer.

Results of processing three different fluoroelastomer emulsions are shown in Table I. For all of these examples, the dewatering separator had the following dimensions:

| | |
|---|---|
| Settling section I.D., in. | 4 |
| Settling section length, in. | 12 |
| Feed section I.D., in. | 4 |
| Feed section length, in. | 10 |
| Compression section length, in. | 7 |
| Metering section I.D., in. | 1.5 |
| Metering section length, in. | 16 |

EXAMPLE II

A process similar to that described in Example I was carried out with the exception that polymer was supplied to the separator in wet crumb form as shown in FIG. 7. The crumb contained 40% by weight water.

TABLE I

| ISOLATION LINE OPERATING DATA | | | |
|---|---|---|---|
| | Fluoroelastomer Types | | |
| | A | B | C-10 |
| Slurry, Temp. °C. | 65 | 70 | 50 |
| Slurry, % by weight Solids | 16.8 | 20.4 | 14.1 |
| Slurry feed rate, gal./hr. | 39 | 36 | 37 |
| Excess water feed rate, gal./hr. | 22 | 25 | 37 |
| Dewatering Separator Data | | | |
| Top Settling Section, Temp. °C. | 80 | 80 | 70 |
| Feed Section, Temp. °C. | 150 | 175 | 40 |
| Conical Section, Temp. °C. | 160 | 175 | 75 |
| Metering Section, Temp. °C. | 150 | 150 | 100 |
| Valve and Tubing Section, Temp. °C. | 150 | 150 | 100 |
| Polymer Temp. at Discharge °C. | 125 | 140 | 90 |
| Discharge Pressure, psi | 1000 | 1000 | 800 |
| Screw Speed, rpm | 50 | 65 | 50 |
| % by weight Volatiles in polymer exiting separator | 2.4 | 2.0 | 3.2 |
| Twinscrew Extruder Data | | | |
| Section #1, Temp. °C. | 150 | 150 | 148 |
| Sections #2 & 3, Temp. °C. | 150 | 150 | 148 |

TABLE I-continued
ISOLATION LINE OPERATING DATA

| | Fluoroelastomer Types | | |
|---|---|---|---|
| | A | B | C-10 |
| Sections #4 & 5, Temp. °C. | 150 | 150 | 148 |
| Sections #6 & 7, Temp. °C. | 100 | 100 | 75 |
| Die Temperature, °C. | 100 | 125 | 80 |
| Melt Temperature, °C. | 135 | 145 | 110 |
| Throughput, lbs./hr. | 60 | 70 | 46.5 |
| Screw Diameter, mm. | 53 | 53 | 53 |
| Screw Speed, rpm | 75 | 75 | 50 |
| Vacuum (in. Hg) | 29 | 29 | 29 |
| % by weight Residual Moisture | 0.22 | 0.19 | 0.15 |
| ML-10 | 65 | 72 | 10 |
| | (@212° F.) | (@250° F.) | (@212° F.) |

A and C-10 - 60% by weight $VF_2$/40% by weight HFP Copolymer
B - 25% by weight TPE/30% by weight HFP/45% by weight $VF_2$ The same separator was used to isolate the fluoroelastomer as was used in Example I, and the crumb was fed to the separator by means of a simple horizontal stuffer screw assembly incorporating a reverserifled barrel.

Results of this experiment are shown in Table II.

TABLE II

| | |
|---|---|
| Crumb feed rate, lbs./hr. | 125 |
| Excess water feed rate, gal./hr. | 30 |
| Separator Data | |
| Top Settling Section Temperature, °C. | 20 |
| Feed Section Temperature, °C. | 30 |
| Conical Section, Temperature, °C. | 100 |
| Metering Section Temperature, °C. | 115 |
| Valve and Tubing Section Temperature, °C. | 100 |
| Polymer temperature at discharge, °C. | 120 |
| Discharge pressure, psi | 800 |
| Screw speed, rpm | 48 |
| % by weight Volatiles in polymer exiting separator | 3 |

POLYMER: TYPE C-10

While it is appreciated that minor changes, alterations and improvements to our invention described hereinabove may be recognized by persons skilled in this art, such changes are deemed by us to be within the scope of our invention and the claims set forth below.

All examples given are for illustration purposes and are not to be construed as limiting our invention in any way.

We claim:

1. Apparatus for the isolation of a heavier-than-water polymer from a mixture of said polymer in water, comprising:
   (a) a vertically disposed separator having:
      (1) an upper settling section;
      (2) a cylindrical feed section located below said settling section and having a feed port through which the said polymer-water mixture may be introduced;
      (3) means for feeding said mixture through the said feed port;
      (4) a conical compression section located below said feed section; tapering into
      (5) a bottom cylindrical metering section having a discharge port located at its bottom end;
      (6) a rotating screw located inside said separator having helical flights extending from the bottom end of the metering section upwards through the compression section and through the feed section;
      (7) an inlet port located near the upper end of said settling section for introducing excess water; and
      (8) a valved discharge port also located near the upper end of said settling section for controlling the water pressure in the settling section, said settling section having sufficient length above said screw flights to permit gravitational separation of said polymer and water in the settling and feed sections.

2. The apparatus of claim 12 in which the means for feeding said mixture comprise a pump.

3. The apparatus of claim 1 in which the means for feeding said mixture comprise a stuffer screw and hopper.

4. The apparatus of claim 1 in which said compression and metering sections have interrupted wall surfaces.

5. The apparatus of claim 1 in which said compression and metering sections are rifled to increase polymer drag.

6. The apparatus of claim 1 coupled with a conventional extractor-extruder.

* * * * *